July 21, 1942.  C. R. HAMMOND  2,290,325
EXCAVATING MACHINE
Filed Nov. 20, 1940  4 Sheets-Sheet 2
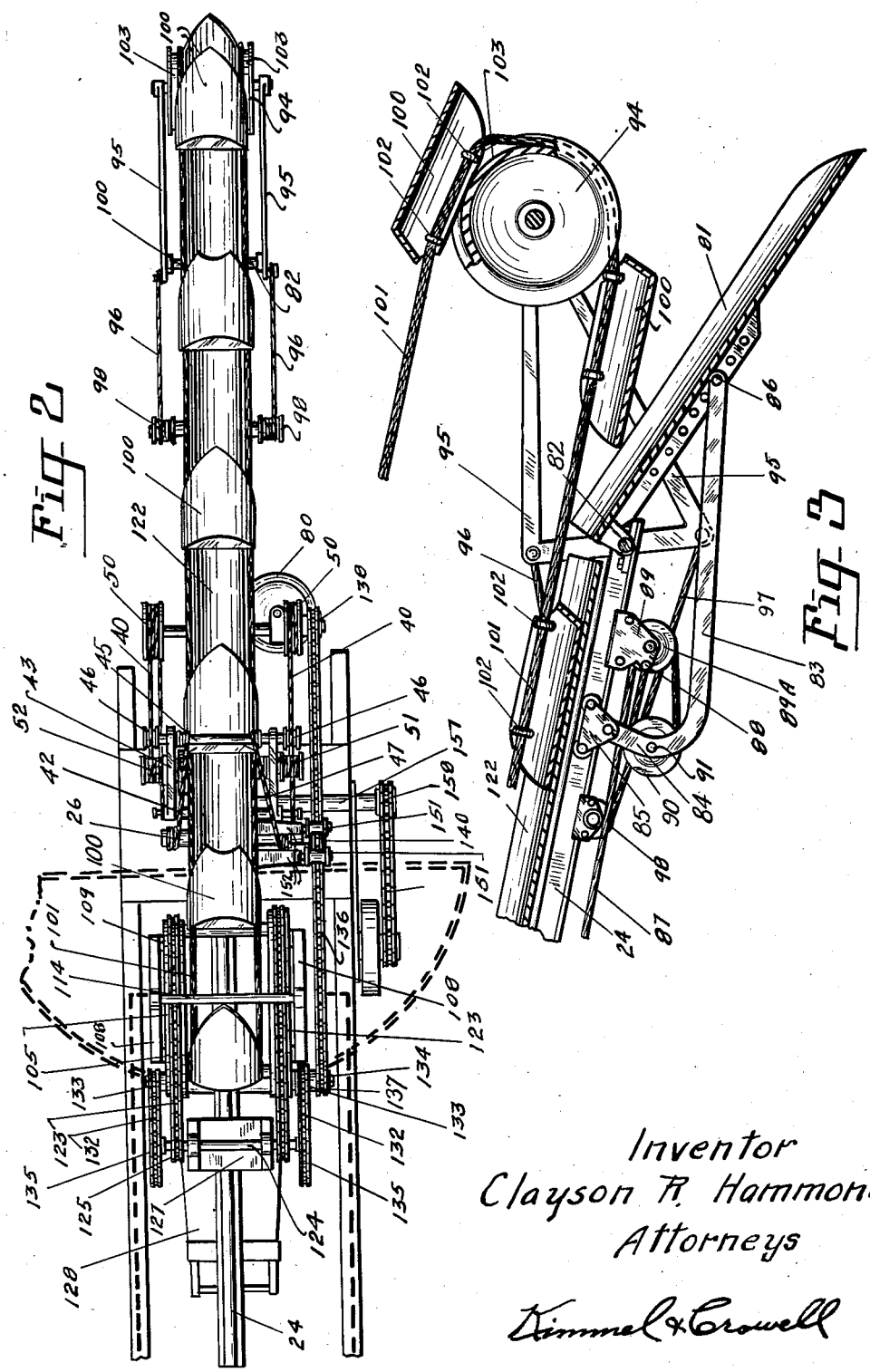
Inventor
Clayson R. Hammond
Attorneys
Kimmel & Crowell July 21, 1942.　　C. R. HAMMOND　　2,290,325
EXCAVATING MACHINE
Filed Nov. 20, 1940　　4 Sheets-Sheet 3
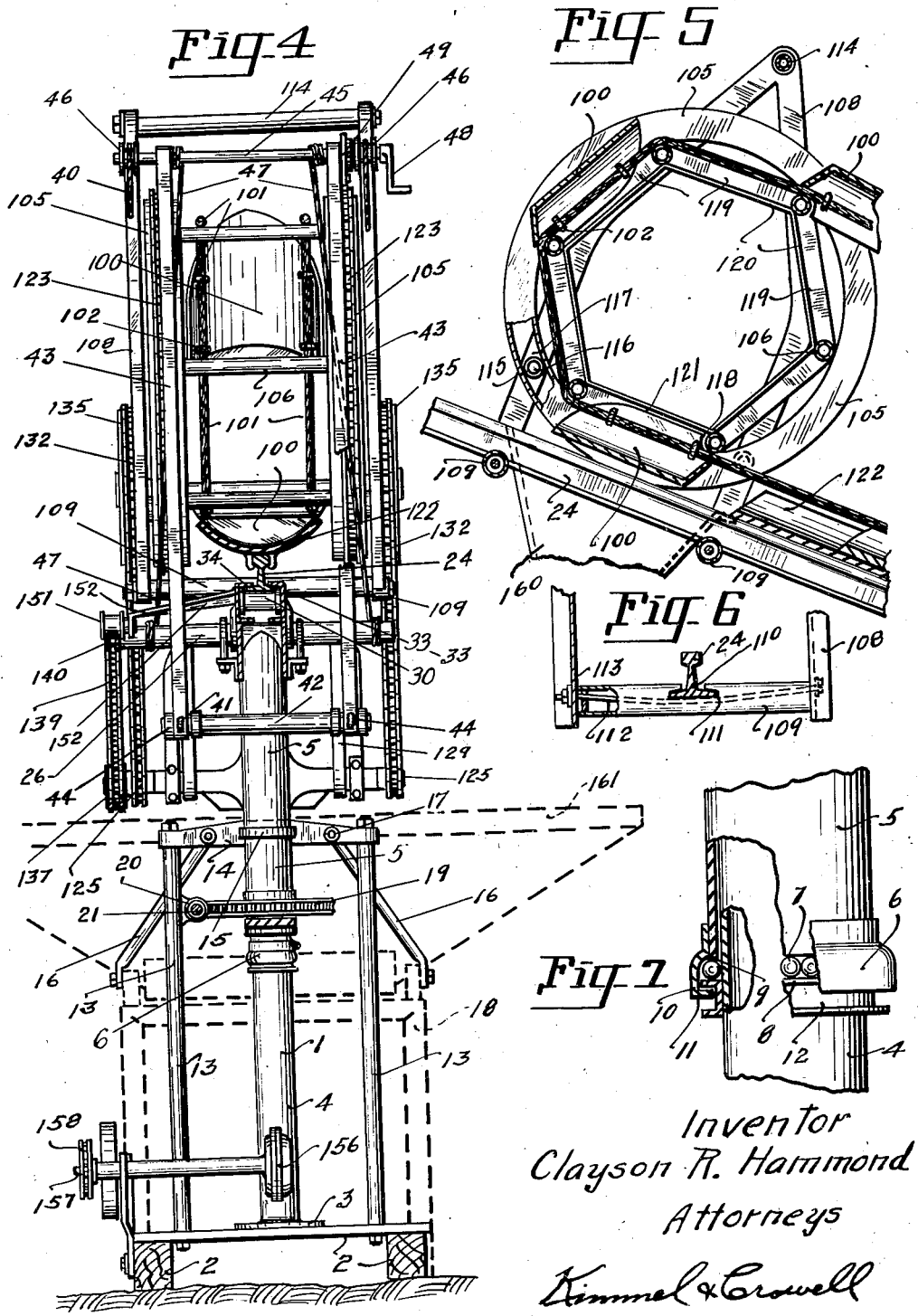
Inventor
Clayson R. Hammond
Attorneys
Kimmel & Crowell July 21, 1942.　　C. R. HAMMOND　　2,290,325
EXCAVATING MACHINE
Filed Nov. 20, 1940　　4 Sheets-Sheet 4
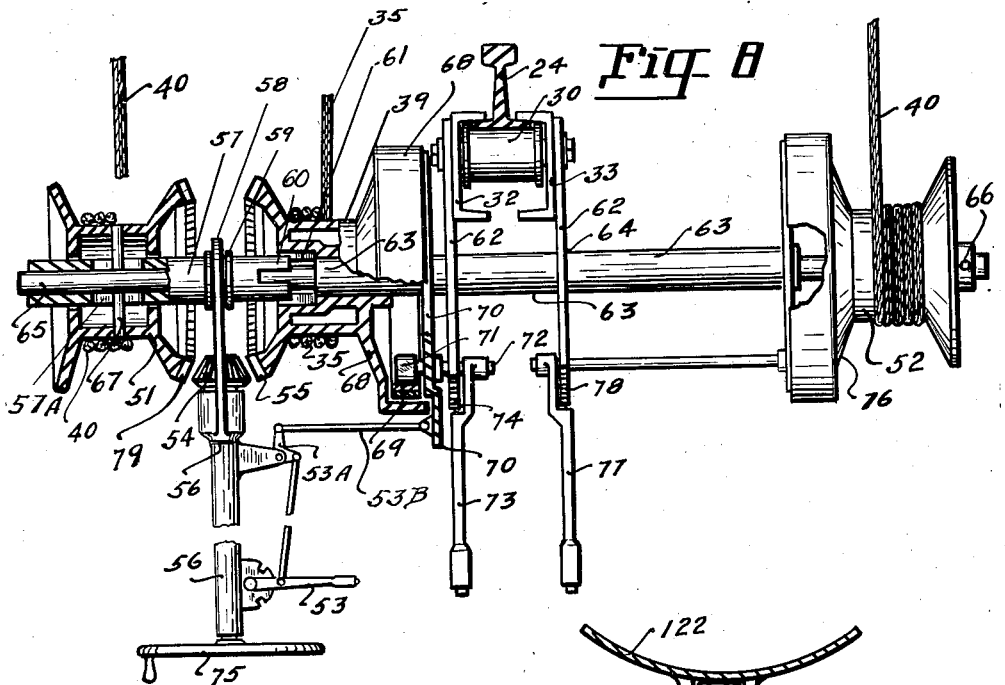
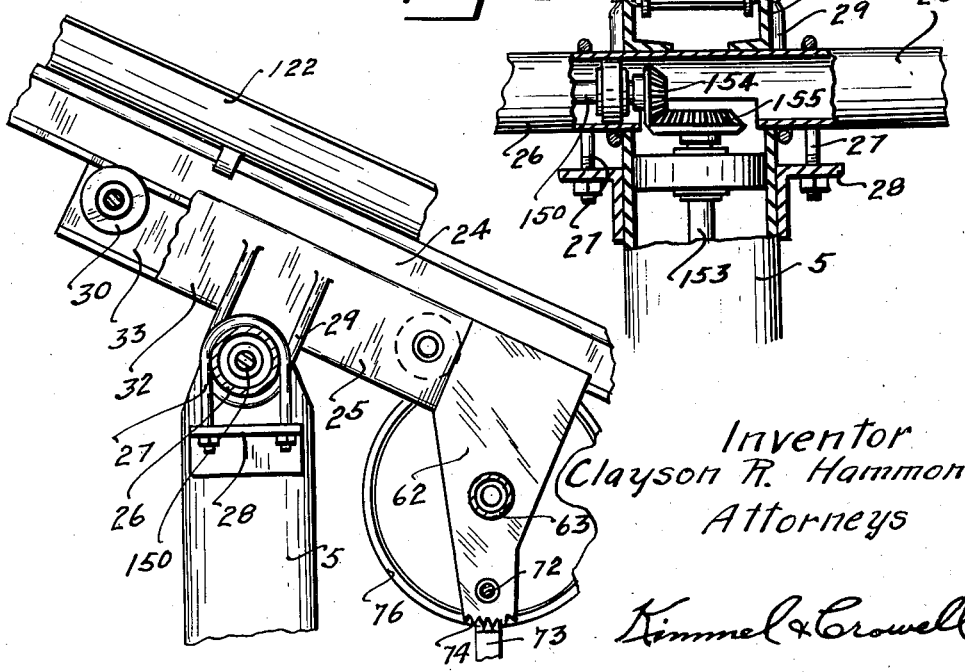
Inventor
Clayson R. Hammond
Attorneys
Kimmel & Crowell Patented July 21, 1942

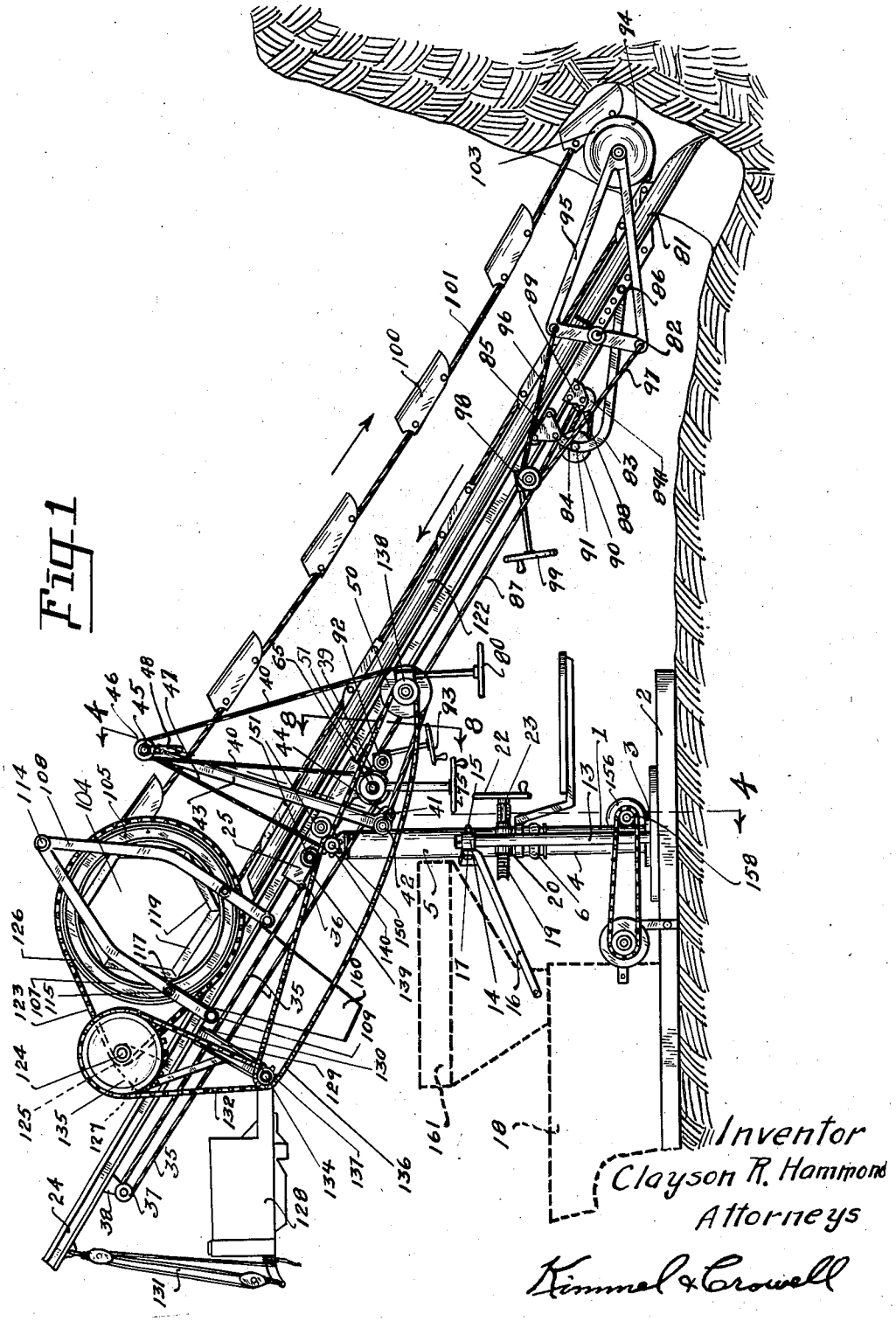

2,290,325

UNITED STATES PATENT OFFICE 2,290,325

EXCAVATING MACHINE

Clayson R. Hammond, Salem, Oreg., assignor of fifty-five per cent to John L. Lynch, Salem, Oreg.

Application November 20, 1940, Serial No. 366,498

13 Claims. (Cl. 37—191)

This invention relates to excavating machines and the primary object of the invention is to excavate materials and deliver them to a concentrating machine.

A further object of my invention is to adopt a system of digging of material where the loosened material is picked up from a spud by a system of conveyor buckets and delivered to a hopper delivery system. The advantages of employing a spud in connection with conveyor buckets is to recover all materials together with values dug, holding the same within the spud until carried away by the conveyor buckets. This is a feature that heretofore has not been employed in connection with conveyor digging buckets, and in this feature I claim a very important and novel system of recovering precious metals.

A still further object of my invention is the mounting of the conveyor buckets, digging spud and delivery hoppers on a supporting beam, said beam traversing within a pivotally mounted saddle block. The beam and saddle block are mounted upon a pedestal, which in turn is mounted upon a sub-frame.

A further object of my invention is the providing of control means for imparting transverse movement of the beam within the saddle block and holding the same in any desired location.

Still another object of my invention is to provide control means for adjusting the digging angle of the digging spud together with adjustable means for locating the conveyor buckets relative to the spud.

Another object of my invention is to apply the draft on the lower side of the bucket line from a driven tumbler, said tumbler being driven from its outer circumference by the source of power.

A further object of my invention is to deliver the materials from the buckets to chutes from the center of the tumbler.

A still further object of my invention is to construct a bucket line by the use of cable instead of chain and the like, eliminating to a great extent cost of up-keep and weight.

These and other incidental objects will be apparent in the drawings, specifications and claims.

Referring to the drawings:

Figure 1 is an assembled side elevation of my new and improved excavating machine, illustrating the position of a concentrating machine by dotted lines.

Figure 2 is a plan view of Figure 1, wherein the beam is pivoted to a horizontal position from that shown in Figure 1 for convenience of illustration.

Figure 3 is a fragmentary sectional view of the digging end of the machine, illustrating the spud mechanism and control, together with the conveyor bucket system mounted thereon, parts broken away for convenience of illustration.

Figure 4 is a sectional end view of Figure 1, taken on line 4—4, looking in the direction indicated.

Figure 5 is a sectional view taken of the driven tumbler, illustrating the method of mounting the tumbler to the supporting beam.

Figure 6 is a detailed view of the supporting bracket for holding the tumbler relative to the beam.

Figure 7 is a fragmentary, partially in section, view of the pedestal illustrating the manner of revolving the upper part of the pedestal together with the beam and its associated mechanism.

Figure 8 is a fragmentary sectional detailed assembly of the cable drum mechanism for adjusting the elevation and the transverse position of the digging end of the beam, the same being taken on line 8—8 of Figure 1, parts of the machine being left out for convenience of illustration.

Figure 9 is a detailed, partially in section, view of the upper end of the pedestal, saddle block and beam, including parts of the power take-off for transmitting power from the excavating machine to any outside source, as for instance the concentrating machine not here shown.

Figure 10 is a sectional side view of Figure 9, showing the working parts of the saddle block.

In my new and improved excavating machine a vertical pedestal 1 is mounted upon a sub-base 2 and 3 and secured there by any suitable fastening means. The pedestal 1 consists of two parts, the lower rigidly mounted portion 4 and the revolvably mounted upper portion 5.

Referring to Figure 7, the upper part 5 revolves upon a suitable thrust bearing 6, which bearing consists of balls 7 mounted upon the race 8. Race 8 is fixedly secured to the lower part of the pedestal 1. The lower end 9 of the upper part 5 of the pedestal 1 provides the upper ball race resting upon the balls 7. A retaining ring 10 is fixedly secured to the lower end of the upper part 5 of the pedestal 1 and this ring holds the balls within the race and is also inwardly turned at 11 for coacting within the channel portion 12 of the lower race 8. This retaining ring not only holds the balls within the race, but prevents any upward movement of the upper part 5 of the pedestal. The pedestal 1 is braced in an upright vertical position by the upwardly extending supporting posts 13, which are secured to the base 2 at their lower ends, and have a yoke 14 mounted upon their upper ends. A ring 15 encircles the upper part 5 of the pedestal 1 and is secured to the yoke 14 by any suitable means. The posts 13 and yoke 14 are braced by the radius rods 16. These radius rods have one of their ends secured to the yoke 14 at 17 and the opposite ends may be fixedly secured to the concentrating machine 18 illustrated in dotted position. I am not showing the details of the concentrating machine in this application, as I am filing a copending application covering the details of construction of a new and improved concentrator.

Fixedly mounted to the part 5 of the pedestal 1 is a worm wheel 19. A worm 20 coacts with this wheel, the worm being mounted to the upright support 13 at 21 and having a suitable hand wheel 22 connected to its shaft 23. The purpose of the worm and worm wheel assembly is to revolve the upper part 5 of the pedestal 1, which determines the radial position of the beam 24.

I will now describe the mounting of the beam 24. A saddle block 25 is pivotally mounted to the upper end of the part 5 of the pedestal 1 in the following manner. A hollow cross arm 26 is fixedly secured to the upper end 5 of the pedestal 1 by the U-bolts 27, the U-bolts passing through the bracket arms 28 or any other suitable method of securing the cross arm 26 to the pedestal 5 may be used. The saddle block 25 is pivotally mounted to the cross arm 26 and is held thereto by the U-straps 29, which encircle the cross arm 26. The beam 24 travels within the saddle block 25 upon the rollers 30. The rollers 30 are journaled to bearings within the saddle block and have flanges 31 on either end for guiding the beam. The saddle block is made up from a pair of oppositely disposed inwardly opening channel irons 32 and 33.

The upper angles 34 of the channel iron guide, maintain the beam 24 in position, best shown in Figures 8, 9 and 10. The beam 24 is made from a railroad iron, or other suitable beam construction material. The traverse position of the beam 24 within the saddle block is maintained by suitable cable connections, as follows: First, a cable 35 is dead ended at 36 to the saddle block 25. This cable is trained about a sheave 37 which is rotatably secured to the beam at 38. The cable 35 is then wrapped about the cable drum 39, best shown in Figures 1 and 8, and the cable 35 forces the beam towards the diggings, or away from the machine. A second set of cables 40 are dead ended at 41 to a cross beam 42, which is fixedly mounted to the upper part 5 of the pedestal 1. This cross beam also supports the upwardly extending U-frame 43, which is pivotally mounted at 44 to the outer ends of the cross beam 42. A cross shaft 45 is mounted to the upper end of the U-frame 43 and has idler sheaves 46 journaled thereon.

The angular position of the U-frame 43 is maintained and held by the guy wires 47 in the desired position, one end of the guy wires being fixedly secured to the cross shaft 45, and their opposite ends being fixedly secured to the cross arm 26 of the upper part 5 of the pedestal 1. In order to change the angle of the U-frame 43 the shaft 45 is revolved by the crank 48, and this shaft is locked in any desired position by the ratchet 49.

The pair of cables 40 are dead ended to the cross bar 42 at 44, then trained a number of times about the cable drums 50. From the drum 50 the cables 40 are trained about the idler sheaves 46 on the upper end of the U-frame 43, thence down to the cable drums 51 and 52 and secured thereto. The object and purpose of the cables 40 is to pull the beam 24 in towards the machine through the saddle block, these cables also act for determining the elevation of the beam.

I will now describe the operation of the moving of the beam within the saddle block and adjusting its angle relative to the excavating machine. Referring to line 8—8 of Figure 1 and then Figure 8, a set of brackets 62 extend down from the saddle block 25 for supporting the hollow housing 63, which has a shaft 65 journaled therein. A cable drum 52 is keyed to this shaft at 66. Another drum 51 is keyed to this same shaft by the key 67. A floating clutch sleeve 57 is keyed to the key 67 by a key slot 57A permitting longitudinal movement. The cable drum 39 is equipped with a brake drum 68, having brake shoes 69 mounted within the drum and held in place by the stationary flange 70, which is fixedly mounted to the housing 63. The brake shoes 69 are operated by the cam 71 in the usual manner, the position of the cam 71 being maintained by the shaft 72, which is keyed to the lever 73, the whole assembly being mounted to the flange 70. The bracket 62 provides a quadrant 74 for holding the lever 73 in desired position.

The cable drums 51 and 52, as stated before, are keyed to the shaft 65 by keys 66 and 67 and revolved in unison. The cable drum 39 revolves freely about the housing 63 and may be disconnected or connected to revolve in unison with the drums 51 and 52 in the following manner: The clutch sleeve 57 has clutch jaws 60 on its one end for engaging with internal clutch jaws 61 within the drum 39. When the mechanism in Figure 8 is in the position shown, this clutch assembly is interlocked and the drums will turn in unison.

The shaft 65 may be locked in a fixed position by the brake drum 76, which is a duplicate of the drum 68. The lever 77 controls the brake mechanism within the drum 76 and the quadrant 78 holds the lever 77 in a predetermined position. I will now describe the operation of the above described drum and cable assembly. In order to thrust the beam outward the pinion 54 is engaged with the ring gear 55 of the drum 39, this is accomplished by the manipulation of the lever 53 rocking the bell crank 53A in a direction to pull the housing 56 together with the pinion 54 towards the ring gear 55 through the link connection 53B connected to the flange 70. After the pinion has been engaged with the ring gear, the hand wheel 75 may be revolved rotating the drum 39 and drums 51 and 52 through the clutch sleeve 57 and shaft 65 in unison. When these drums are operated in unison the following cable action takes place. The cable 35 is wound on the drum 39 opposite to the cables 40, which are wound on the drums 51 and 52, therefore when all drums are revolved in one direction the cable 35 is being wound up forcing the beam out towards the diggings while the cables 40 are being paid out permitting the extension of the beam, or vice versa.

I have just described one of the ways of extending the digging beam with the mechanism shown in Figure 8; other combinations may be employed to operate the same. The relation between the cables 35 and 40 may be changed by manipulating the lever 53 so as to engage the pinion 54 with the ring gear 79, this also disengages the clutch sleeve 57 from the drum 39 allowing the brake drum 68 to be held stationary while the drum 51 is revolved by the hand wheel 75 and the pinion 54 changing the relation between the cables for different beam positions. The angular relation between the beam and the pedestal may be changed by rotating the hand wheel 80, which rotates the drums 50, and due to the fact that the cables 40 are wrapped about these drums, rotation of the drums will raise or lower them on the cables 40, changing the angle of the beam relative to the pedestal.

Referring to Figure 3, I will now describe the digging end of the beam, a digging spud 81 is pivotally mounted to the end of the beam at 82, the angle of the spud is determined by the position of two parallel goose necked spud braces 83. The ends 84 of the braces are supported by the floating trolley 85 which straddles the beam 24. The opposite ends of the braces are pivotally mounted at 86 to the spud. The positions of the braces are determined by the cable 87, which has one of its ends dead ended at 88 to the sheave block 89. It is trained about the sheave 90, which is journaled at 91 to the brace 83, thence around the sheave 89A to the cable drum 92. Drum 92 is controlled by the hand wheel 93, best shown in Figure 1. The cable drum 92 is mounted to the saddle block 25, therefore, when the beam is brought in towards the machine the spud will be permitted to drop as shown in Figure 3 by the slacking of the cable 87, the adjustable cable drum 92 providing adjustment for different relative positions of the beam.

A pair of idler sheaves 94 are journaled to the outer ends of the bell crank sheave supports 95, which are pivotally mounted to the beam at 82. The angle of these bell cranks is maintained by the cables 96 and 97 being trained about the drums 98 controlled by the hand wheel 99. Conveyor buckets 100 are mounted to the endless cables 101 by suitable clamps 102, the edges of the buckets and the cable being trained about and between the flanges 103 of the sheaves 94. The upper loop of the bucket line is trained around the bucket line driver and tumbler 104.

The bucket line driver consists of two parallel spaced rings 105 spaced apart by cross bars 106, these rings having annular grooves 107 formed in their outer faces, best shown in Figure 5.

A pair of spaced A-frames 108 are mounted to the beam in the following manner. Compression spacers 109 are mounted to the beam 24 at 110 by straddling the flange of the beam with the notched portion 111 of the spacer, the spacer being compressed with the tension rod 112 which also holds the lower ends 113 of the A-frames 108 relative to the beam.

The upper ends of the A-frames are tied together by the spreader bar 114. Rollers 115 are journaled to the stub shafts 116, which are mounted to the A-frames at 117. The bucket line driver and tumbler is mounted between the A-frames by these rollers, said rollers working in the annular grooves 107 of the spaced rings 105, guiding and supporting the driver. By supporting the driver, as just described, clearance is provided for the bucket line to operate and discharge the materials down through the driver and tumbler.

The bucket line cable is trained around the spacer 106, best shown in Figure 5. The heel 118 of the bucket engages with the spacer, driving the bucket line 101. Angle bars 119 bridge between the spacers, one of their angles 120 extending inwardly upon which rests the upper edge 121 of the bucket 100. A trough 122 is mounted on the upper surface of the beam for guiding the loaded buckets and saving precious metals.

The bucket line driver is driven by chains 123 trained about the parallel rings 105 from the counter shaft 124 and sprockets 125. Annular flexible facings 126 are secured to the rings 105 upon which are trained the chains 123. In this construction digging shocks are more or less eliminated between the bucket line and the driving mechanism.

The counter shaft 124 is journaled to the bearing bracket 127, said bracket being fixedly mounted on the beam 24.

A power plant 128 is supported by the brackets 129, said brackets being fixed to the beam 24 at 130 on its driving end, and by the hoist 131 on its opposite end. The power plant drives the chains 132 by sprockets 133, which are keyed to the drive shaft 134 of the power plant, these chains driving the sprockets 135, which are keyed to the counter shaft 124.

An additional power take-off chain 136 is driven by the sprocket 137 of the power plant at its one loop and having its opposite loop running around idler pulley 138. The upper side 139 of the chain 136 drives the sprocket 140, which is keyed to the shaft 150, said chain being held in contact with the sprocket 140 by the idler pulleys 151 journaled to the brackets 152. The shaft 150 drives the shaft 153 through the pinions 154 and 155, the lower end of the shaft 153 terminating in the gear box 156. A horizontal shaft 157 extends from the gear box to the sprocket 158 from where power may be supplied to any requirement.

In the operation of my machine the beam 24 is extended to the desired position by the operation of the hand wheel 75 and brake levers 73 and 77 which control the reeling in or out of the cables 35 and 40 heretofore described. The elevation of the beam is next controlled by the adjustment of the drum 50 by the hand wheel 80 running the drum up or down on the cable 40 heretofore described.

The angle of the spud 81 is next controlled by the drum 92 and cable 84, bringing the spud to the working position as shown in Figure 1. The bucket line is next operated in the direction of the arrows, Figure 1. This direction of travel deposits the materials on the spud from where it is picked up and delivered to the driver tumbler 104 by way of the trough 122, and as the buckets follow around the tumbler, best shown in Figure 5, the materials are emptied from the buckets into the chute 160, shown in dotted position, thence to the hopper 161 of the concentrator 18, shown in dotted position. The radial position of the digging end of the beam may be determined by the hand wheel 22, as heretofore described.

I do not wish to be limited to the particular mechanical construction shown and described in the drawings, as other mechanical equivalents may be used still coming within the scope of the claims to follow.

What I claim is:

1. An excavator comprising a standard including a stationary lower part and a swivelled upper part, means for rotating said upper part relative to said lower part, a beam guiding yoke pivotally carried by said upper part, a beam engaging said yoke, an endless conveyor including spaced bucket members, means movably mounting said conveyor on said beam, and a trough fixed to said beam beneath the lower run of said conveyor.

2. An excavator comprising a standard including a stationary lower part and a swivelled upper part, means for rotating said upper part relative to said lower part, a beam guiding yoke pivotally carried by said upper part, a beam slidably engaging said yoke, means adjusting said beam longitudinally of said yoke, an endless bucket conveyor carried by said beam, operating means for said conveyor, a trough fixed to said beam beneath the lower run of said conveyor, a spud member pivotally carried by said beam adjacent the forward end of said trough, and means connected with said spud member and said beam for swinging said spud member into alignment with said trough upon forward adjustment of said beam.

3. An excavator comprising a beam, a standard for said beam, means movably mounting said beam on said standard, an endless conveyor carried by said beam, said conveyor including a pair of parallel endless cables, a plurality of digging buckets, means engaging the sides of said buckets for securing said buckets to said cables, a trough secured upon the top of the beam for guiding and supporting the lower run of the conveyor, a pair of idler sheaves at one end of said beam for supporting the forward end of the conveyor, means swingably supporting said sheaves forwardly of said beam, means for adjusting said sheave supporting means relative to the forward end of said beam, and operating means for said conveyor.

4. An excavator comprising a beam, a standard for said beam, means movably mounting said beam on said standard, an endless conveyor carried by said beam, said conveyor including a pair of parallel endless cables, a plurality of digging buckets, means engaging the sides of said buckets for securing said buckets to said cables, a pair of idler sheaves at one end of said beam, means swingably supporting said sheaves forwardly of said beam, means for adjusting said sheave supporting means relative to the forward end of said beam, a trough fixed to said beam beneath said conveyor, a spud member pivotally carried by said beam at the forward end of said trough, means for adjusting said spud member relative to said trough, and operating means for said conveyor.

5. An excavator comprising a beam, a standard for said beam, means movably mounting said beam on said standard, an endless conveyor carried by said beam, said conveyor including a pair of parallel endless cables, a plurality of digging buckets, means engaging the sides of said buckets for securing said buckets to said cables, a pair of idler sheaves at one end of said beam, means swingably supporting said sheaves forwardly of said beam, means for adjusting said sheave supporting means relative to the forward end of said beam, a trough fixed to said beam beneath said conveyor, a spud member pivotally carried by said beam at the forward end of said trough, means for adjusting said spud member relative to said trough, and a combined conveyor driving and bucket emptying member for said conveyor carried by said beam.

6. An excavator comprising a beam, a standard for said beam, means movably mounting said beam on said standard, an endless conveyor carried by said beam, said conveyor including a pair of parallel endless cables, a plurality of digging buckets, means engaging the sides of said buckets for securing said buckets to said cables, a pair of idler sheaves at one end of said beam, means swingably supporting said sheaves forwardly of said beam, means for adjusting said sheave supporting means relative to the forward end of said beam, a trough fixed to said beam beneath said conveyor, a spud member pivotally carried by said beam at the forward end of said trough, means for adjusting said spud member relative to said trough, and a cage-like combined conveyor and bucket emptying member carried by said beam adjacent the rear end thereof.

7. In an excavator, a swingable beam, a digging conveyor above said beam, a trough fixed to the upper side of said beam and engaging beneath the lower run of said conveyor, idler sheaves at the forward end of said beam for said conveyor, and a conveyor operator adjacent the rear of said beam, said operator comprising a pair of annular outwardly facing channel members, connecting bars connecting said channel members together, a pair of supporting members fixed to said beam and extending upwardly therefrom, and rollers carried by said supporting members engaging within said channel members for rotatably mounting said channel member on said beam.

8. In an excavator, a swingable beam, a digging conveyor above said beam, a trough fixed to the upper side of said beam and engaging beneath the lower run of said conveyor, idler sheaves at the forward end of said beam for said conveyor, and a conveyor operator adjacent the rear of said beam, said operator comprising a pair of annular outwardly facing channel members, connecting bars connecting said channel members together, a pair of supporting members fixed to said beam and extending upwardly therefrom, rollers carried by said supporting members engaging within said channel members for rotatably mounting said channel member on said beam, and a plurality of angle members fixed to the inner faces of said channel members for engagement with said conveyor to move said conveyor upon rotation of said operator.

9. In an excavator, a swingable beam, a digging conveyor above said beam, said conveyor including spaced buckets, each bucket having a recessed heel portion extending downwardly from the open upper side thereof, a trough fixed to the upper side of said beam and engaging beneath the lower run of said conveyor, idler sheaves at the forward end of said beam for said conveyor, and a conveyor operator adjacent the rear of said beam, said operator comprising a pair of annular outwardly facing channel members, connecting bars connecting said channel members together, a pair of supporting members fixed to said beam and extending upwardly therefrom, rollers carried by said supporting members engaging within said channel members for rotatably mounting said channel member on said beam, and a plurality of angle members fixed to the inner faces of said channel members for engagment with said conveyor to move said conveyor upon rotation of said operator, the recessed heel portions of said buckets engaging said connecting bars to thereby hold said conveyor against slippage relative to said operator.

10. In an excavator, a swingable beam, a digging conveyor above said beam, a trough fixed to the upper side of said beam and engaging beneath the lower run of said conveyor, idler sheaves at the forward end of said beam for said conveyor, and a conveyor operator adjacent the rear of said beam, said operator comprising a pair of annular outwardly facing channel members, connecting bars connecting said channel members together, a pair of supporting members fixed to said beam and extending upwardly therefrom, means engaging said beam for securing said supporting members to said beam, and rollers carried by said supporting members engaging within said channel members for rotatably mounting said channel members on said beam.

11. An excavator comprising a standard, a beam, means mounting said beam on said standard for horizontal rotation and vertical swinging relative to said standard, means shifting said beam endwise, a combined digging and endless conveyor carried by said beam, a trough mounted upon and bodily carried by the beam, said trough providing a combined guide and support for the lower run of said conveyor, an angularly adjustable spud disposed forwardly of said beam arranged below the forward portion of said run, pivotally connected at its rear end with the forward end of the beam and forming a continuation of the trough from the forward end of the latter and means for vertically swinging said beam.

12. In an excavator including a swingable beam, and a combined digging member and endless conveyor carried by said beam; a trough fixed to said beam beneath one run of said conveyor, a spud member at one end of said trough; means pivotally securing said spud member to said beam, a pair of rock levers pivotally secured at an end thereof to said spud member, a carriage movably carried by said beam, means pivotally securing the opposite ends of said levers to said carriage, and means for rocking said levers to thereby adjust the angular relation of said spud member relative to said trough.

13. In an excavator including a swingable beam, and a combined digging member and endless conveyor carried by said beam; a trough fixed to said beam beneath one run of said conveyor, a spud member at one end of said trough; means pivotally securing said spud member to said beam, a pair of rock levers pivotally secured at an end thereof to said spud member, a carriage movably carried by said beam, means pivotally securing the opposite ends of said levers to said carriage, and means connected with said beam and said levers for rocking said lever.

14. In an excavator including a swingable beam, and a combined digging member and endless conveyor carried by said beam; a trough fixed to said beam beneath one run of said conveyor, a spud member at one end of said trough; means pivotally securing said spud member to said beam, a pair of rock levers pivotally secured at an end thereof to said spud member, a carriage movably carried by said beam, means pivotally securing the opposite ends of said levers to said carriage, means for rocking said levers, and means carried by said beam supporting the forward portion of said conveyor for vertical adjustment relative to said beam.

15. An excavator comprising a beam, a standard for said beam, means movably mounting said beam on said standard, an endless conveyor carried by said beam, said conveyor including a pair of endless carriers, bucket members fixed to said carriers, a trough carried by said beam and engaging beneath said buckets on one run of said conveyor, a transversely arcuate spud carried by said beam and extending from an end of said trough, the forward end of said spud projecting beyond the adjacent end of said conveyor, means pivotally supporting said spud from said beam, and means for adjusting the angular position of said spud relative to said trough.

16. An excavator comprising a beam, a supporting structure for the beam including revoluble and angularly adjustable means for the beam, and endless conveyor supported over and bodily moving with the beam, an angularly adjustable structure carried by and extending from the beam and including idler sheaves for the forward end of the conveyor, a combined guide and supporting trough for the lower run of the conveyor mounted upon and bodily moving with the beam, and an angularly adjustable spud pivotally connected with the forward end of the beam arranged at the forward end of the trough and below the forward portion of said run.

17. An excavator comprising a beam, a supporting structure for the beam including revoluble and angularly adjustable means for the beam, an endless conveyor supported over and bodily moving with the beam, an angularly adjustable structure carried by and extending from the beam and including idler sheaves for the forward end of the conveyor, a combined guide and supporting trough for the lower run of the conveyor mounted upon and bodily moving with the beam, an angularly adjustable spud pivotally connected with the forward end of the beam arranged at the forward end of the trough and below the forward portion of said run, and a material dumping structure correlated with said conveyor, carried by and bodily moving with the beam and arranged at the rear end of the trough.

18. An excavator comprising a beam, a supporting structure for the beam including revoluble and angularly adjustable means for the beam, an endless conveyor supported over and bodily moving with the beam, an angularly adjustable structure carried by and extending from the beam and including idler sheaves for the forward end of the conveyor, a combined guide and supporting trough for the lower run of the conveyor mounted upon and bodily moving with the beam, and an angularly adjustable spud pivotally connected with the forward end of the beam arranged at the forward end of the trough and below the forward portion of said run, a cage-like combined conveyor operator, and material dumping structure carried by, bodily moving with and extending above said beam forwardly of the rear end of the latter and arranged rearwardly of the rear end of the trough.

CLAYSON R. HAMMOND.